UNITED STATES PATENT OFFICE.

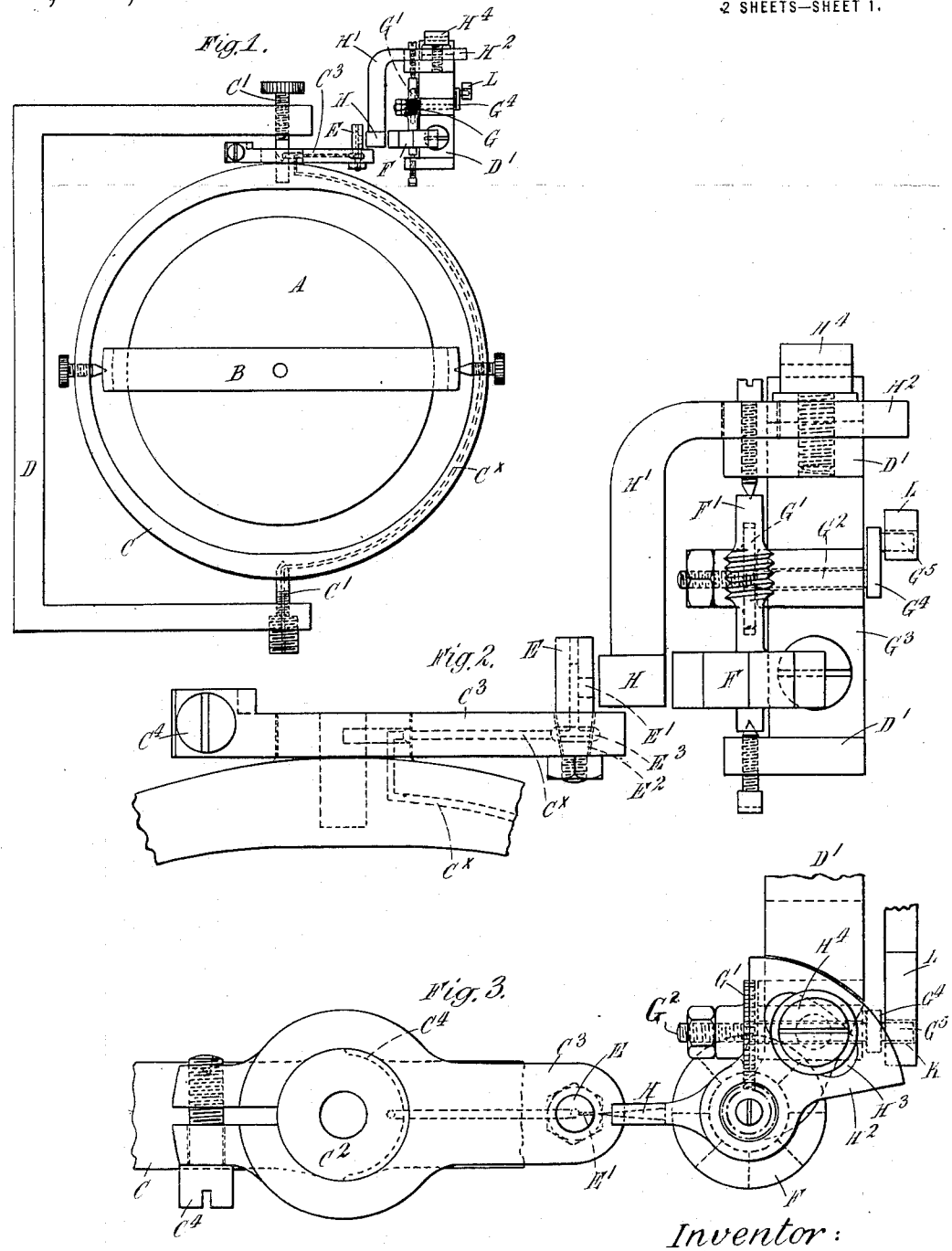

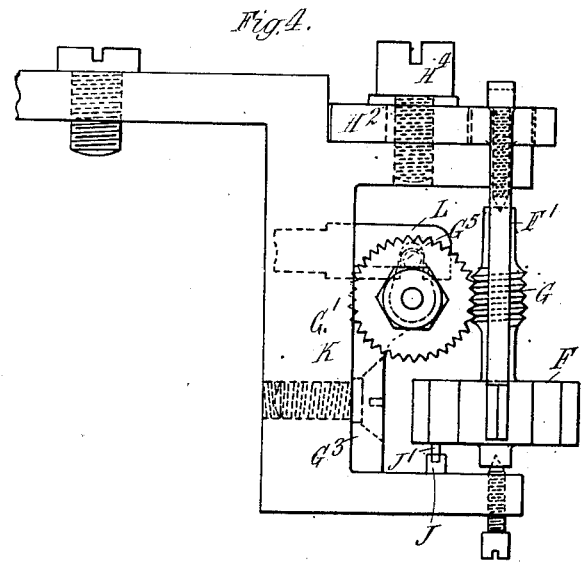
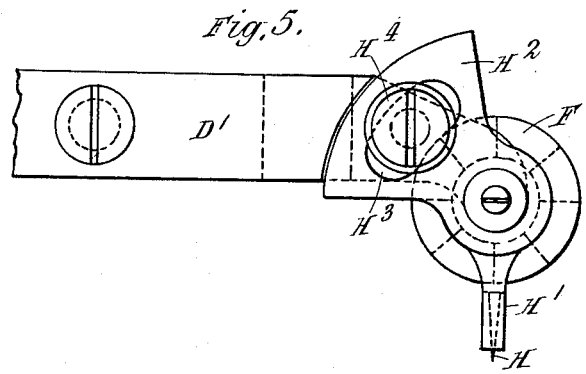

FRANK W. DODD, OF WEYMOUTH, ENGLAND.

GYROSCOPIC STEERING MECHANISM FOR AUTOMOBILE TORPEDOES.

1,156,350. Specification of Letters Patent. Patented Oct. 12, 1915.

Application filed June 2, 1915. Serial No. 31,788.

*To all whom it may concern:*

Be it known that I, FRANK WILLIAM DODD, a subject of the King of Great Britain, residing at the Whitehead Torpedo Works, Weymouth, in the county of Dorset, England, have invented certain new and useful Improvements in Gyroscopic Steering Mechanism for Automobile Torpedoes, of which the following is a specification.

This invention relates to gyroscopic steering apparatus for automobile torpedoes. Such apparatus usually comprises a gyroscope so mounted that the direction of the axis of its spinning wheel remains fixed in space, notwithstanding deviations in the course of the torpedo, and mechanism controlled by the gyroscope for actuating the vertical rudders so as to compensate for horizontal deviation in either direction, and thereby maintain the torpedo on its assigned course during a run. The mechanism referred to usually comprises a steering engine operated by compressed air from the torpedo supply, and a controlling valve operated by direct mechanical connection with the gimbal system of the gyroscope. In order to prevent the gyroscope from being disturbed owing to reaction due to the mechanical connection of its gimbal system with the controlling valve of the steering engine, it is preferable to render the gyroscope capable of exerting its controlling function without necessitating direct mechanical connection either with the valve itself, or with any electrical switch or other device for connecting up a source of power with the valve, and the chief object of the present invention is to provide improved means serving to dispense with such connection, and to render the gyroscope entirely free from disturbance arising from re-action of any kind.

According to the present invention the gyroscopic steering apparatus effects its control by means of an air-jet directed from a nozzle carried on the gimbal system on to a jet-actuated device which participates in horizontal deviations of the torpedo and controls the rudder-actuating mechanism. The nozzle is preferably mounted vertically on the outer (vertical) gimbal ring of the gyroscope, and the air-jet issues from it horizontally in such a direction that on the one hand its reaction produces no rotative effect on the gimbal system and on the other hand its impact on the jet-actuated device is such as to operate the same only when the jet-actuated device is moved from its normal position relatively to the nozzle owing to horizontal deviation of the torpedo. To facilitate the obtaining of the correct normal direction for the air-jet, the nozzle may be carried on an angularly adjustable arm clamped to a circular boss on the outer gimbal ring concentric with its axis, and the nozzle may itself be capable of angular adjustment about its own axis. The jet-actuated device may comprise a radially bladed fan or similar reversible air-driven motor having a vertical axis of rotation, and the orifice in the nozzle may be so shaped as to project the air-jet in the form of a narrow rectangular stream of air, having its longer cross sectional axis parallel with the vertical axis of rotation of the fan. The compressed air for maintaining the jet may be supplied through the bearings of the outer gimbal ring of the gyroscope and through passages in the said ring. A knife-edged deflector may be situated between the nozzle and the fan to divide the air-jet into two streams having opposite rotative effects on the fan when the latter is in its normal position. It will be understood that when owing to deviation of the torpedo the fan and deflector are shifted bodily relatively to the nozzle, the direction of the air jet is no longer symmetrical with relation to the fan and the latter is therefore driven in one or other direction by the jet. The fan is mechanically connected through motion-reducing gear such as a worm and worm wheel or otherwise to the controlling valve or valves of the steering engine.

In order that the invention may be clearly understood and readily carried into effect, the same will now be described more fully with reference to the accompanying drawings in which:—

Figure 1 is an elevation showing the general arrangement of one form of apparatus adapted to operate in accordance with the invention. Fig. 2 is an enlarged elevation and Fig. 3 a corresponding plan of the more important parts of the apparatus shown in Fig. 1. Fig. 4 is an elevation viewing the apparatus from the left and at right angles to Fig. 2, and Fig. 5 is a corresponding plan with the gearing between the fan and the controlling valve omitted for the sake of clearness.

A is the gyro-wheel, B the inner (horizontal) gimbal ring, and C the outer (vertical) gimbal ring. The gyro-wheel and gimbal system are mounted on vertical pivots C' C' in a frame D which is secured to a convenient part of the torpedo.

$C^3$ is a horizontal arm embracing and secured to a boss $C^2$ on the outer gimbal ring, by means of a clamping screw $C^4$, the said arm carrying at its outer end a vertical nozzle E in which is a thin rectangular lateral orifice E' only a few thousandths of an inch in width.

D' is a frame secured to a convenient part of the torpedo so as to participate in all movements of the same, and F is a fan the spindle F' of which is mounted in vertical bearings and is formed with a worm G gearing with a worm wheel G' on a spindle $G^2$ carried in a horizontal bearing in a bracket $G^3$.

H is a knife-edged deflector situated symmetrically between the nozzle E and the fan F. Air is supplied to the nozzle E by way of the hollow lower pivot C' of the outer gimbal ring C and through a passage $C^x$ in this ring and in the boss $C^2$ and horizontal arm $C^3$. The air jet issuing from the nozzle E is normally directed toward the vertical axis of the fan F, and when so directed is divided by the deflector H into two streams which impinge equally on the outer parts of the blades of the fan on both sides of its axis of rotation, thus exerting opposite rotative effects upon the fan so that it remains stationary; when the torpedo deviates from its course, carrying the frame D' with it relatively to the outer gimbal ring C, the deflector H guides the air jet to the outer parts of the blades of the fan on one or the other side of its axis of rotation according to the direction of the deviation, thereby causing the fan to rotate. Owing to the fact that the deflector H directs the air toward the outer parts of the fan blades, the air jet is very effective even when the deviation of the torpedo is very slight. It is of course understood that the fan rotates in the one or the other direction, according to the direction in which the torpedo is horizontally deviating. A stop J lies in the path of a pin J' on the fan to prevent the latter from performing more than one revolution, this extent of angular movement being sufficient to cause the spindle $G^2$ to be turned through a small angle. A crank $G^4$ on the spindle $G^2$ is provided with a pin $G^5$ which engages in a notch K (Fig. 4) in the head L of the control valve of the steering engine (not shown), the small angular movement of the spindle $G^2$ being thus able to bring about the small valve movement required to cause the steering engine to move the vertical rudder or rudders.

In order to facilitate adjustment of the position of the nozzle E relatively to the deflector and fan, the horizontal arm $C^3$, which carries the nozzle, is adjustably clamped to the boss $C^2$ by the screw $C^4$ as shown clearly in Figs. 2 and 3, and the latter is formed with a groove $C^4$ around half of its circumference so that a free passage for the compressed air is preserved, even if the arm $C^3$ be angularly adjusted around the boss $C^2$ within wide limits. The boss $C^2$ is of course central with respect to the vertical pivot C' of the outer gimbal ring. Also in order to insure that the direction of the air jet issuing from the orifice in the nozzle E is truly radial considered relatively to the axis of the vertical pivots C' the said nozzle is angularly adjustable about its own axis in its conical seating $E^2$, and a groove $E^3$ extends around the wall of the seating so that the passage for the compressed air from the arm $C^2$ into the base of the nozzle E is preserved notwithstanding angular adjustment of the nozzle in its seating. It is due to the truly radial direction of the jet that there is avoided any rotative tendency such as might otherwise be imparted by its reaction to the gimbal C.

In order to permit of angular adjustment of the knife-edged deflector H about the axis of the fan F, the said deflector is secured to or forms part of an arm H' depending from a plate $H^2$, which is angularly movable about the axis of the fan F and is formed with a segmental slot $H^3$ through which passes a clamping screw $H^4$.

If it is desired to utilize the kinetic energy remaining in the air-jet after it has done work on the fan, the latter may be inclosed in a box or casing and the air issuing therefrom may be conducted to a second nozzle so arranged that the jet issuing therefrom serves to maintain the speed of rotation of the gyro-wheel A, after the manner described in British specification No. 11833 of 1907.

Although the invention has been described in detail with reference to one constructional form of apparatus, it will be understood that various constructional variations may be resorted to without departing from the scope of the invention.

What I claim and desire to secure by Letters Patent of the United States, is:—

1. Gyroscopic steering apparatus comprising a gyroscope and a steering mechanism controlled thereby, having means for discharging an air-jet under directive control of said gyroscope, and jet-actuated means operated by said jet and controlling said steering mechanism.

2. Gyroscopic steering apparatus comprising a gyroscope and a steering mechanism controlled thereby, having means for discharging an air-jet including a nozzle carried by the gimbal system of the gyroscope, and a jet-actuated means operated by said jet and controlling said steering mechanism.

3. Gyroscopic steering apparatus comprising a gyroscope and a steering mechanism controlled thereby, having means for discharging an air-jet including a nozzle carried by the gimbal system of the gyroscope and so mounted that such air-jet issues from it in radial direction and hence produces no rotative effect on the gimbal system, and a jet-actuated means operated by said jet and controlling said steering mechanism.

4. Gyroscopic steering apparatus comprising a gyroscope and a steering mechanism controlled thereby, having means for discharging an air-jet under directive control of said gyroscope, and an air-driven motor operated by such jet and operatively connected to control said steering mechanism.

5. Gyroscopic steering apparatus comprising a gyroscope and a steering mechanism controlled thereby, having means for discharging an air-jet under directive control of said gyroscope, and a reversible fan driven by said jet and operatively connected to control said steering mechanism.

6. Gyroscopic steering apparatus comprising a gyroscope and a steering mechanism controlled thereby, having means for discharging an air-jet under directive control of said gyroscope, and jet-actuated means operated by said jet and controlling said steering mechanism, and an air-jet deflector located between the jet nozzle and said jet-actuated means.

7. Gyroscopic steering apparatus comprising a gyroscope and a steering mechanism controlled thereby, having means for discharging an air-jet under directive control of said gyroscope, and a reversible fan driven by said jet and operatively connected to control said steering mechanism, and an air-jet deflector between the jet-nozzle and fan, said deflector being laterally adjustable.

8. Gyroscopic steering apparatus comprising a gyroscope and a steering mechanism controlled thereby, having means for discharging an air-jet including a nozzle carried by the gimbal system of the gyroscope, and a jet-actuated means operated by said jet and controlling said steering mechanism, said nozzle being laterally adjustable.

9. Gyroscopic steering apparatus comprising in combination a gyro-wheel and gimbal system, an angularly adjustable horizontal arm secured to a boss on the outer gimbal ring, a vertical nozzle having a lateral orifice and carried by the horizontal arm with freedom of angular movement about its own axis, a steering mechanism, and a jet-actuated means operated by the jet from said nozzle and controlling such steering mechanism.

10. Gyroscopic steering apparatus comprising a gyroscope and a steering mechanism controlled thereby, having means for discharging an air-jet under directive control of said gyroscope, a reversible fan driven by said jet, and a valve operated from said fan to control said steering mechanism.

11. Gyroscopic steering apparatus comprising a gyroscope and a steering mechanism controlled thereby, having means for discharging an air-jet including a nozzle carried by the outer gimbal ring, an inlet for compressed air through a pivot of said outer ring, and said ring having a duct from said inlet to said nozzle, and jet-actuated means operated by said jet and controlling said steering mechanism.

12. Gyroscopic steering apparatus comprising in combination a gyro-wheel and gimbal system, an angularly adjustable horizontal arm secured to a boss on the outer gimbal ring, a vertical nozzle having a lateral orifice and carried by the horizontal arm with freedom of angular movement about its own axis, a radially-bladed fan and motion reducing gear participating in horizontal deviations of the torpedo, a knife-edged deflector between the nozzle and the fan, and a valve or valves operated by the motion-reducing gear and controlling the rubber-actuating mechanism.

In witness whereof, I have hereunto signed my name.

FRANK W. DODD.